United States Patent [19]

Weiler

[11] Patent Number: 5,038,899
[45] Date of Patent: Aug. 13, 1991

[54] INTERNAL SHOE BRAKE, IN PARTICULAR A PARKING BRAKE, IN A DISK HUB

[75] Inventor: Rolf Weiler, Eppstein, Fed. Rep. of Germany

[73] Assignee: Alfred Teves GmbH, Frankfurt am Main, Fed. Rep. of Germany

[21] Appl. No.: 502,389

[22] Filed: Mar. 30, 1990

[30] Foreign Application Priority Data

Mar. 31, 1989 [DE] Fed. Rep. of Germany ....... 3910367

[51] Int. Cl.$^5$ .......................... B60T 1/06; F16D 51/50; F16D 65/00
[52] U.S. Cl. .................. 188/341; 188/205 R; 188/250 F; 188/331
[58] Field of Search .............. 188/341, 331, 332, 333, 188/340, 325, 327, 329, 330, 205, 206, 363, 364; 250 F

[56] References Cited

U.S. PATENT DOCUMENTS

| | | | |
|---|---|---|---|
| 1,851,737 | 3/1932 | Stoner | 188/329 |
| 1,875,029 | 8/1932 | La Brie | 188/332 |
| 2,001,939 | 5/1935 | Parker | 188/332 |
| 2,022,254 | 11/1935 | Pentz | 188/341 X |
| 2,096,716 | 10/1937 | Hammond | 188/330 X |
| 2,325,998 | 8/1943 | Schnell | 188/341 X |
| 2,372,415 | 3/1945 | Eksergian . | |
| 2,730,199 | 1/1956 | Britton . | |
| 3,109,519 | 11/1963 | Dombeck | 188/332 |
| 4,296,845 | 10/1981 | Roberts | 188/341 |
| 4,345,673 | 8/1982 | Callaghan et al. . | |

FOREIGN PATENT DOCUMENTS

| | | | |
|---|---|---|---|
| 973850 | 10/1951 | Fed. Rep. of Germany . | |
| 3428135 | 2/1986 | Fed. Rep. of Germany . | |
| 2153462 | 8/1985 | United Kingdom . | |
| 2162602 | 2/1986 | United Kingdom | 188/330 |

Primary Examiner—Douglas C. Butler
Attorney, Agent, or Firm—Robert P. Seitter; Gordon J. Lewis

[57] ABSTRACT

An internal shoe brake, which is being used as a parking brake in a disc hub, is designed so that it can be preassembled in a ready-to-be-installed fashion. For that purpose, the anchor plate, serving as a cover plate, is mounted to a support by at least two fixing members. The fixing members are provided with heads which mesh free from play with bores provided in the axle support. Fixing of the support and the anchor plate to the axle support is effected through the intermediary of a screw. The screw and the fixing members jointly transmit the circumferential forces onto the axle support.

11 Claims, 1 Drawing Sheet

INTERNAL SHOE BRAKE, IN PARTICULAR A PARKING BRAKE, IN A DISK HUB

BACKGROUND OF THE INVENTION

The present invention relates to an internal shoe brake for use as a parking brake in a disc brake system. The system comprises brake shoes carried by an anchor plate serving as a cover plate, a stationary support bearing against ends of the brake shoes and a mechanical device for actuating the brake.

In known internal shoe brakes which are being used as parking brakes in a disc brake system, such as German printed and published patent application 34 28 135, the anchor plate is formed from thin-walled plate metal incapable of absorbing any circumferential forces created by the rotation of the brake shoes against the brake drum. An anchor seat is provided between the brake shoes and above the anchor plate to help absorb these forces. The anchor plate and seat are attached to the axle shank of the vehicle by two studs and a bolt. The studs and bolt absorb most of the circumferential forces.

As the plate and seat are fixed to the axle shank, the brake unit cannot be pre-assembled as a unit prior to being attached to the vehicle itself. Instead, it can be mounted only when fitted to the vehicle.

SUMMARY OF THE INVENTION

It is, therefore, the object of the present invention to connect the anchor plate, serving as a cover plate, with the support such that the brake can be supplied in the form of an assembly unit and can be easily mounted to the axle support in an assembly line setting.

The anchor plate is mounted to the support by special fixing means protruding from the axle support cover through the anchor plate and towards the stationary support. The special fixing means are provided with heads which are seated without play in associated bores of the axle support when the brake is mounted and can thus absorb circumferential forces since the heads establish a connection between the axle support and the stationary support. The mounting of the stationary support to the axle support is effected by means of a screw, the anchor plate being adapted to be screwed onto the axle support at further points. Due to the fact that the stationary support and the anchor plate are tightly connected with each other, the brake can be built as an assembly unit with brake shoes mounted to the anchor plate and actuating device, so that the assembly unit only requires mounting to the axle support. Thereby, easy installation on the assembly line is made possible.

An advantageous design provides for making the support in a cost-saving manner from section steel which is drawn accurate to size.

Further embodiments describe possible design forms of the fixing means and their heads. For example, pins or rivets with cylindrical heads or also square-head or hexagon-head screws and/or socket head screws with heads of any shape desired would be conceivable.

BRIEF DESCRIPTION OF THE DRAWINGS

One possible design will be described by means of the figures wherein.

DETAILED DESCRIPTION OF THE PREFERRED EMBODIMENT

Figure 1:
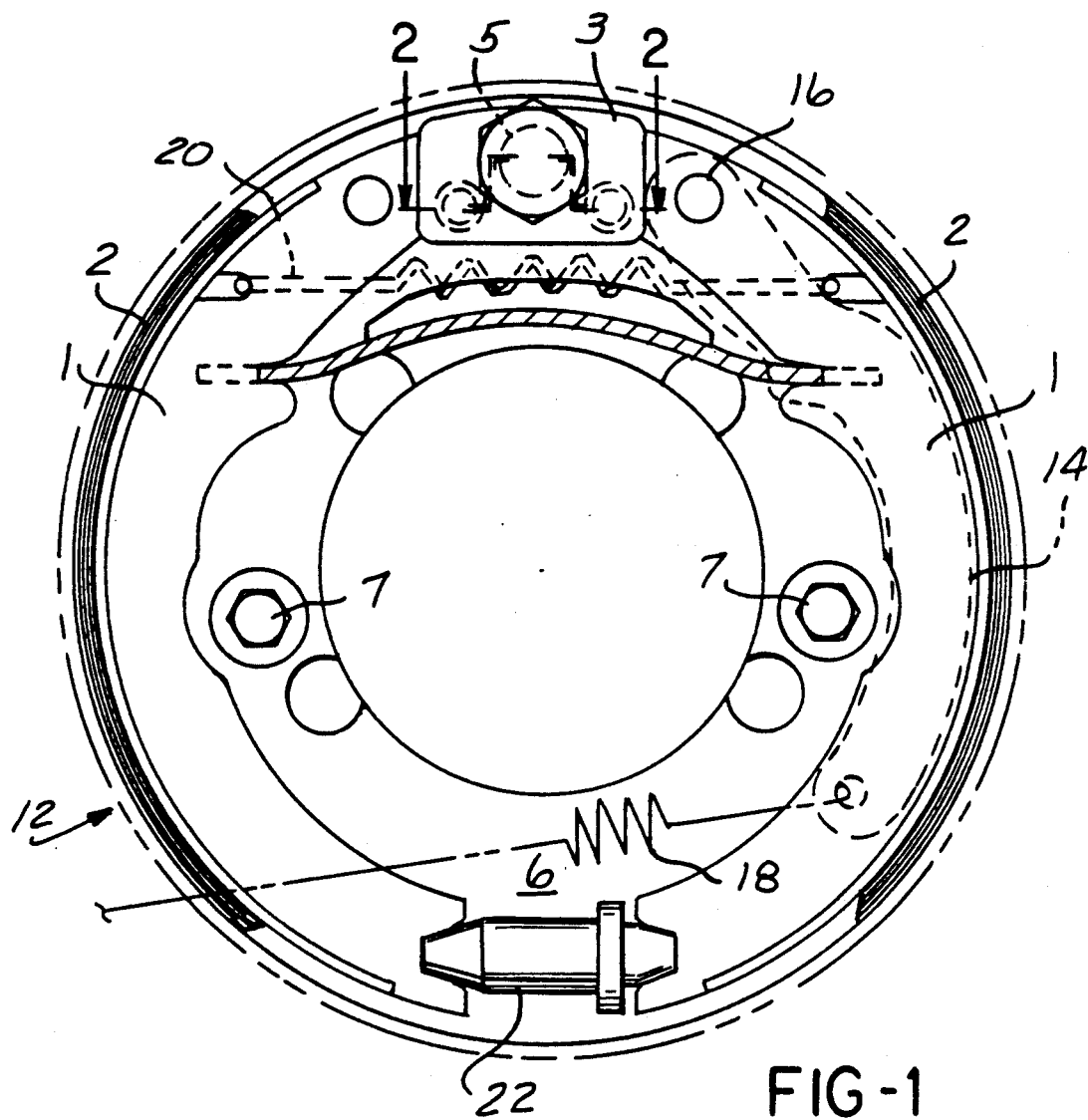
FIG. 1 shows a side elevation of an internal shoe brake, major parts which are concealed being illustrated by a broken line.
Figure 2:
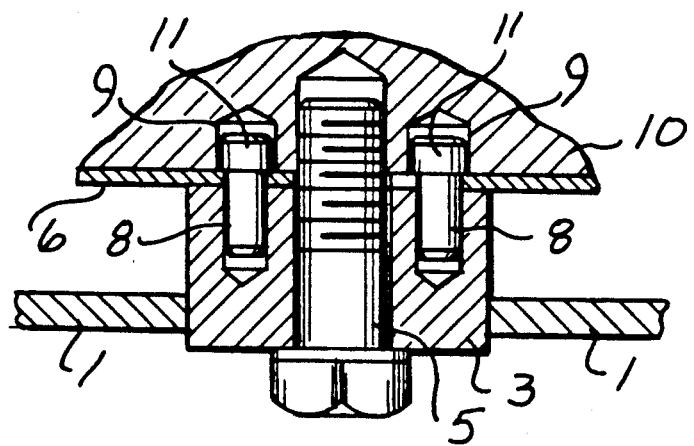
FIG. 2 shows a sectional view taken on line 2—2 of FIG. 1 showing the mounting of an anchor plate and a support to the axle support.

FIG. 1 shows brake shoes 1 in their inoperative position equipped with brake linings 2. The brake shoes 1 are mounted onto an anchor plate 6 by suitable means (not shown) so as to be moved in and out of engagement with a brake drum 12. The brake shoes 1 bear against a support 3. Lever 14 is positioned between brake shoes I and anchor plate 6. Lever 14 rotates about pin 16 when the mechanical device 18 of the parking brake assembly is activated. The brake shoes 1 are spring biased away from brake drum 12 by spring 20. Adjusting means 22 realigns brake shoes 1 as brake linings 2 wear down from use. Screw 5 is arranged between the two fixing means 4 and passes through the support 3 and the anchor plate 6 to screw onto the axle support 10 as shown in FIG. 2. The anchor plate 6 is further screwed onto the axle support by means of two screws 7.

FIG. 2 shows a sectional view of the mounting of the anchor plate 6 to the support 3 by two fixing means 4 in the form of two pins 8. It is understood that fixing means 4 may be provided in any form such as rivets, screws, square heads or multi-cornered heads wherein each means 4 has a head and shaft extending from the head, as is well known in the art. The two heads 11 of the pins 8 are arranged in bores 9 of the axle support 10 as illustrated. The support 3 is screwed onto the axle support 10 from the brake shoe side towards the anchor plate 6, the screw thereby protruding from the anchor plate 6. The circumferential forces are transmitted from the brake shoes 1 onto the support 3 and are diverted onto the axle support 10 via three points, namely the two pins 8 with their heads 11 and the screw 5.

What is claimed is:

1. Internal shoe brake for use as a parking brake in a disc brake system comprising:
   brake shoes;
   an anchor plate serving as a cover plate and fixedly attached to said brake shoes and an axle support;
   a stationary support bearing against ends of said brake shoes;
   a mechanical device for actuating said brake;
   fixing means for mounting said anchor plate to said support; and
   a screw mounting said support and said anchor plate to said axle support wherein said anchor plate, said brake shoes, said support and said actuating device form a pre-assembled unit in a ready-to-be-installed fashion wherein said screw and said at least two fixing means jointly transmit circumferential forces onto said axle support, said forces being generated during braking.

2. The improvement of claim 1, wherein the support is a piece of section steel drawn accurate to size.

3. The improvement of claim 1, wherein the fixing means comprises pins.

4. The improvement of claim 1, wherein the fixing means comprises rivets.

5. The improvement of claim 1, wherein the fixing means comprises screws.

6. The improvement of claim 1, wherein the fixing means have multiple-cornered heads.

7. The improvement of claim 1, wherein the fixing means having square heads.

8. The improvement of claim 1, wherein the fixing means have three sided heads.

9. The improvement of claim 1, wherein the fixing means have cylindrical heads.

10. Internal shoe brake for use as a parking brake in a disc brake system comprising:
   brake shoes;
   an anchor plate serving as a cover plate and fixedly attached to said brake shoes and an axle support;
   a stationary support bearing against ends of said brake shoes;
   a mechanical device for actuating said brake;
   fixing means for mounting said anchor plate to said support; and
   a screw mounting said support and said anchor plate to said axle support, said anchor plate, said brake shoes, said support and said actuating device forming a pre-assembled unit, wherein the circumferential forces created by braking are transmitted from said brake shoes onto said support and are diverted onto said axle support via said fixing means and said screw.

11. The invention as defined in claim 10, wherein said at least two fixing means comprises pins, each of said pins having a head and a shaft, wherein said circumferential forces are transmitted from said brake shoes onto said support and are diverted onto said axle support via said pins through said heads and said screw.

* * * * *